United States Patent [19]

Kameyama et al.

[11] Patent Number: 5,264,882
[45] Date of Patent: Nov. 23, 1993

[54] CONTINUOUS TAKING CAMERA

[75] Inventors: Nobuyuki Kameyama; Michio Cho, both of Tokyo, Japan

[73] Assignee: Fuji Photo Film Co., Ltd., Kanagawa, Japan

[21] Appl. No.: 946,097

[22] Filed: Sep. 17, 1992

[30] Foreign Application Priority Data

Sep. 17, 1991 [JP] Japan .................................. 3-267195

[51] Int. Cl.⁵ ............................................... G03B 1/00
[52] U.S. Cl. ..................................... 354/120; 354/125; 352/39
[58] Field of Search .................... 354/120, 125; 352/39

[56] References Cited

U.S. PATENT DOCUMENTS 3,202,069  8/1965  Cummins et al. .
4,101,913  7/1978  Gallistel et al. ................. 354/125
5,210,557  5/1993  Kameyama et al. ............. 354/125

FOREIGN PATENT DOCUMENTS 2-105132  4/1990  Japan .

Primary Examiner—Monroe H. Hayes
Attorney, Agent, or Firm—Young & Thompson

[57] ABSTRACT

A continuous taking camera has eight exposure chambers arranged in two horizontal rows and four vertical columns. One 35 mm full size original frames of photographic film is divided into eight sub-frames. One taking lens is disposed in front of each of the exposure chambers. A stationary shutter plate is disposed behind the taking lenses. Openings are formed in the stationary plate behind the respective lenses. First and second shutter disks are rotatably supported coaxially on the stationary plate on a single shaft. A first group of two holes is formed in the first disk. A second group of two holes is formed in the second disk. The second disk is rotated by the rotation of the first disk, there being a pin-and-slot lost motion connection between the two disks, so that different sets of holes in the disk register with each other, depending on the direction of rotation of the disks. Thus, the holes of the groups are either in registry with or displaced from each other, in accordance with a direction of rotation of the disks. When the holes are in registry and the disks are rotated, they open/close the eight stationary openings sequentially. The disks are actuable through one complete cycle of movement to take sequential scenes on the eight sub-frames.

21 Claims, 14 Drawing Sheets

CONTINUOUS TAKING CAMERA

BACKGROUND OF THE INVENTION

1. Field of the Invention

The present invention relates to a camera adapted continuously to take photographs by taking an identical subject a plurality of times at a predetermined time interval upon one release of a shutter, more particularly to an improvement of a shutter mechanism for a continuous taking camera.

2. The Known Prior Art

Continuous photograph taking is very convenient in the field of sports and the like since the position of a subject at various times can be recorded as still images. A single lens reflex camera is enabled to take continuous photographs, by attaching a motor drive unit to the camera body, the motor drive unit winding a photographic film one frame after another at a high speed. In such known cameras, however, the operation of the film advancing mechanism and shutter unit generates loud noises. A mechanism is also necessary for synchronizing film advance with shutter release, resulting in a complicated structure and high cost. Furthermore, since several frames are used for each continuous taking, the consumption of film is great, and so the number of continuous takings per roll of film is small. Still further, photographic paper is cut into separate photoprints of original frames so that even in the case of continuously taken scenes, the photoprints are required to be arranged by the photographer himself in the order of taking, when they are observed.

There have been proposed cameras adapted continuously to take photographs by taking one subject a plurality of times at a predetermined time interval upon one release of a shutter via a plurality of exposure chambers. In Japanese Patent Laid-Open Publ. No. 2-105132, a continuous taking camera has been proposed wherein a shutter has a single rotary disk, and one original frame of 35 mm type full size (36×24 mm) is split into four original sub-frames in a 2×2 matrix, on which four consecutive scenes are sequentially taken in order following one direction of rotation upon one shutter release.

The continuous taking camera disclosed in U.S. Pat. No. 3,202,069 has shutter blades provided for each of a plurality of exposure chambers, and springs for driving the shutter blades, and takes a plurality of original sub-frames by sequentially activating the shutter blades.

The construction according to Japanese Patent Laid-Open Publ. No. 2-105132 is, however, inapplicable to a continuous taking camera for photographing a larger number of sub-frames upon one release of a shutter. It is also difficult and laborious to visually recognize the order of continuous taking on a photoprint obtained from the film exposed in such a camera, even if the customer visually compares the four scenes.

In the camera disclosed in U.S. Pat. No. 3,202,069, the shutter mechanism is excessively complicated, and many parts are required, hence the cost is high. A camera with this structure is difficult to design compactly, and it is difficult to make the shutter blades behave uniformly and so it is difficult to standardize the exposure time and the intervals between sub-frames.

The assignee of the present application proposed in U.S. patent application Ser. No. 07/746,889, filed Aug. 19, 1991, a continuous taking camera which incorporates a shutter having two rotary disks disposed side by side. Each disk has two movable holes, which expose four sub-frames sequentially.

There is a problem in this camera in that the side-by-side disposition of the two disks requires an excessively large space for the shutter in the camera.

SUMMARY OF THE INVENTION

In order to solve the foregoing problems, an object of the present invention is to provide a continuous taking camera which is compact.

In order to achieve the above and other objects and advantages of this invention, 2N exposure chambers are arranged in a matrix for allowing light to fall on photographic film, so as to split at least one full size original frame into sub-frames arranged in two rows across the width of the film and in N columns along the length of the film, wherein N is an integer equal to at least 3. 2N taking lenses are disposed respectively in front of the exposure chambers. A stationary plate is disposed between the taking lenses and the exposure chambers. 2N stationary openings are formed in the stationary plate in correspondence with the exposure chambers. First and second shutter disks are rotatably supported on the stationary plate. A first hole group is formed in the first disk and is constituted of M holes, where M is an integer equal to at least 2. A second hole group is formed in the second disk and is constituted of M holes. Displacing means is provided for relatively displacing the first and second disks in order to change the first and second hole groups between an open condition wherein holes of respective hole groups are superposed one on another and a closed condition wherein holes of respective hole groups are displaced one from another which hole groups are adapted to open and then close the 2N stationary openings sequentially, which two disks are so movable as to take sequential scenes on the 2N sub-frames.

Such a continuous taking camera is easy to design so as to be compact, because the shutter disks are supported coaxially. The shutter can be much less complicated, and a smaller number of parts is required, hence the cost is low. Photographic film can be consumed effectively in continuous photograph takings, without waste.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
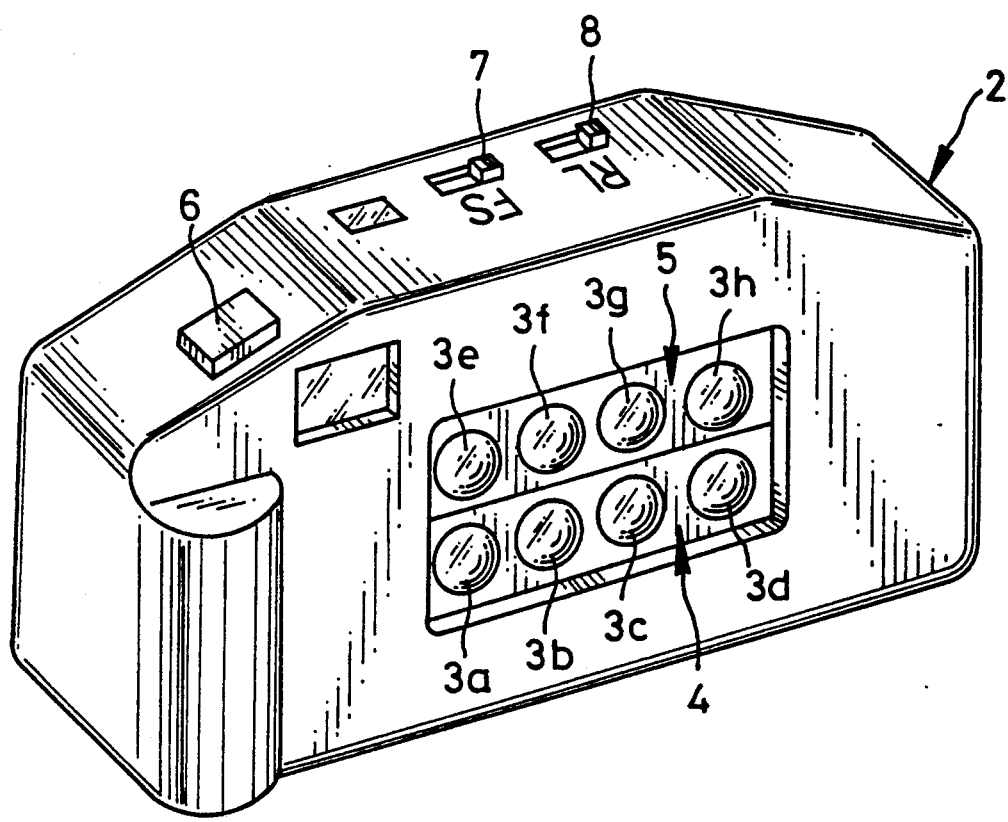
FIG. 1 is a perspective view illustrating a novel continuous taking camera according to the present invention.

FIG. 1 shows the outer appearance of a novel continuous taking camera according to the invention. A camera body 2 has eight taking lenses 3a, 3b, . . . , 3h disposed on the front in two horizontal rows and four vertical columns. The optical axes of the taking lenses 3a to 3h are all parallel. The lower lenses 3a to 3d are formed integrally with a lens plate 4. The upper lenses 3a to 3h are formed integrally with a lens plate 5. The lens plates 4 and 5 are molded from transparent material e.g. acrylic resin. On the upper side of the camera body 2 are disposed a shutter release button 6, a button 7 for selecting the sequential speed of taking consecutive scenes, and a button 8 for selecting the sequential direction from R and L modes.

Figure 2:
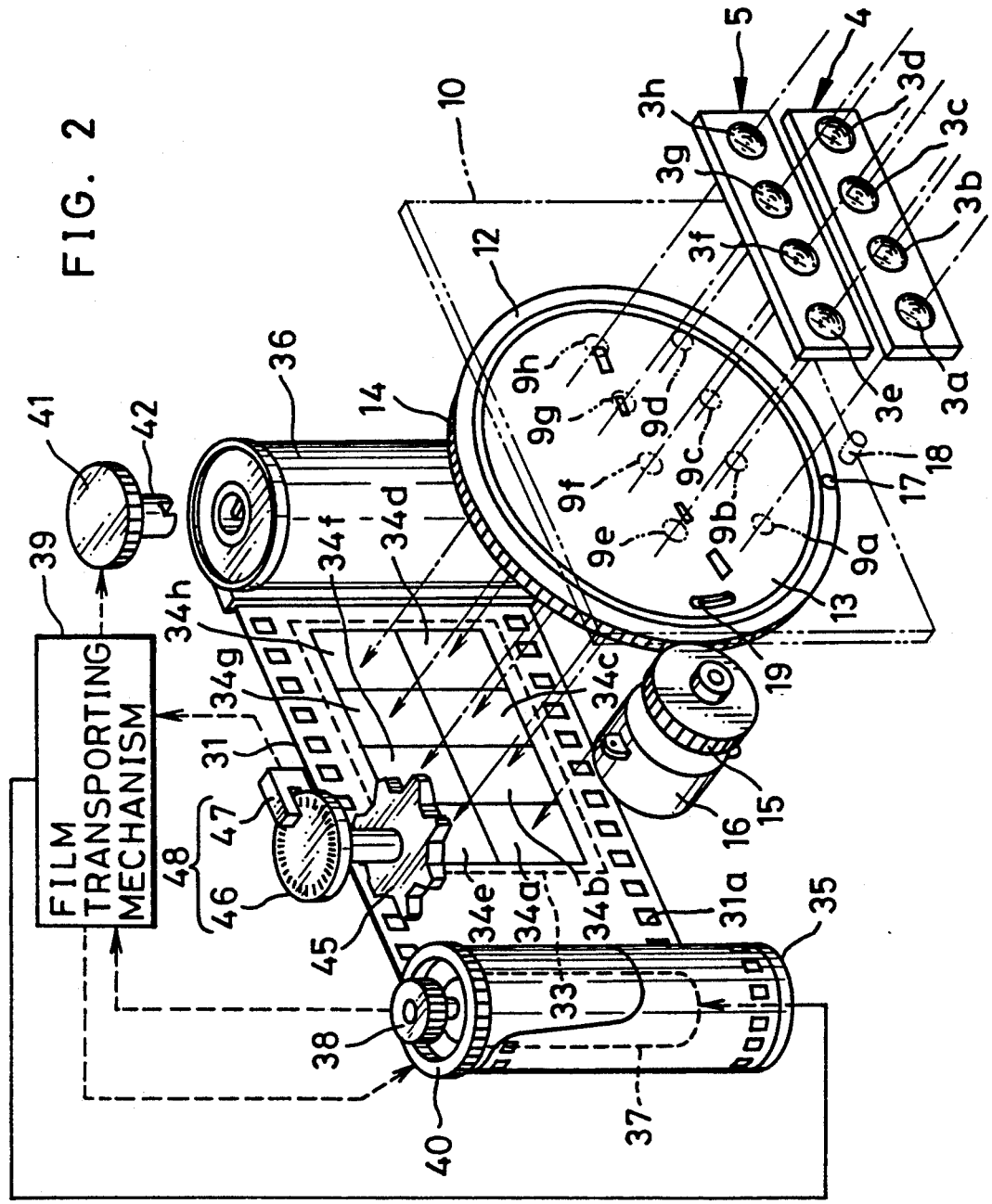
FIG. 2 is an exploded perspective view schematically illustrating important parts of the mechanism of the novel camera with photographic film.
Figure 3:
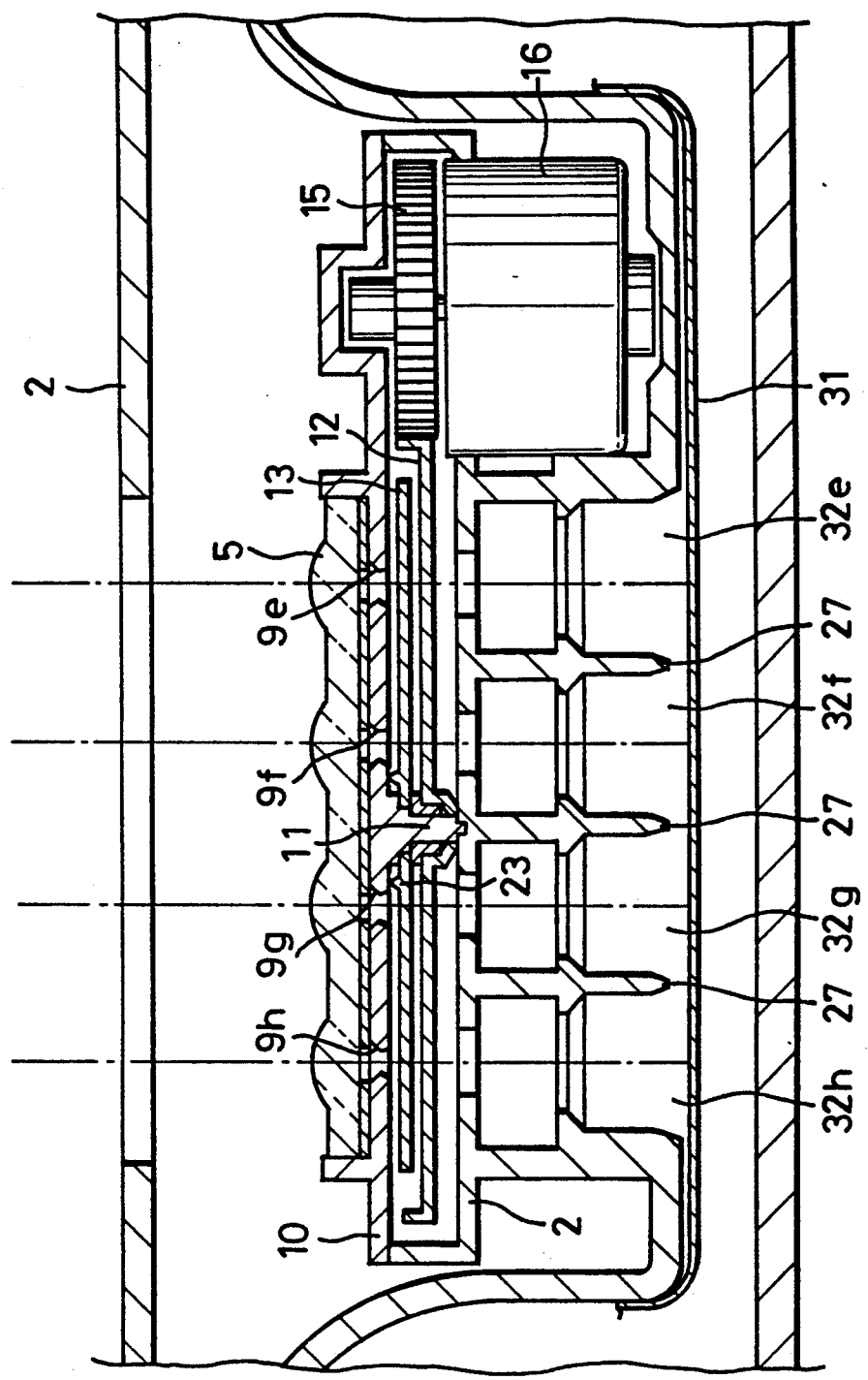
FIG. 3 is an enlarged horizontal section illustrating the mechanism illustrated in FIG. 2.

As illustrated in FIGS. 2 and 3, a shutter plate 10 is fixed within the camera body 2, and has eight stationary openings 9a to 9h in registry with the taking lenses 3a to 3h. The openings 9a to 9h have all the same internal diameter. On the stationary plate 10 is formed integrally a shaft 11 on which two shutter disks 12 and 13 are supported coaxially rotatably. The disk 12 is provided with teeth 14 formed thereabout. The teeth 14 are in mesh with a drive gear 15 mounted on a stepping motor 16, which causes the disk 12 to rotate upon rotation of the gear 15. On the disk 12 is fixed a reflector 17 adapted to be photoelectrically detected by a photo sensor 18 of the reflection type mounted on the stationary plate 10. It is possible by use of reflector 17 and detector 18 to detect a home position of the disk 12.

Figure 4:
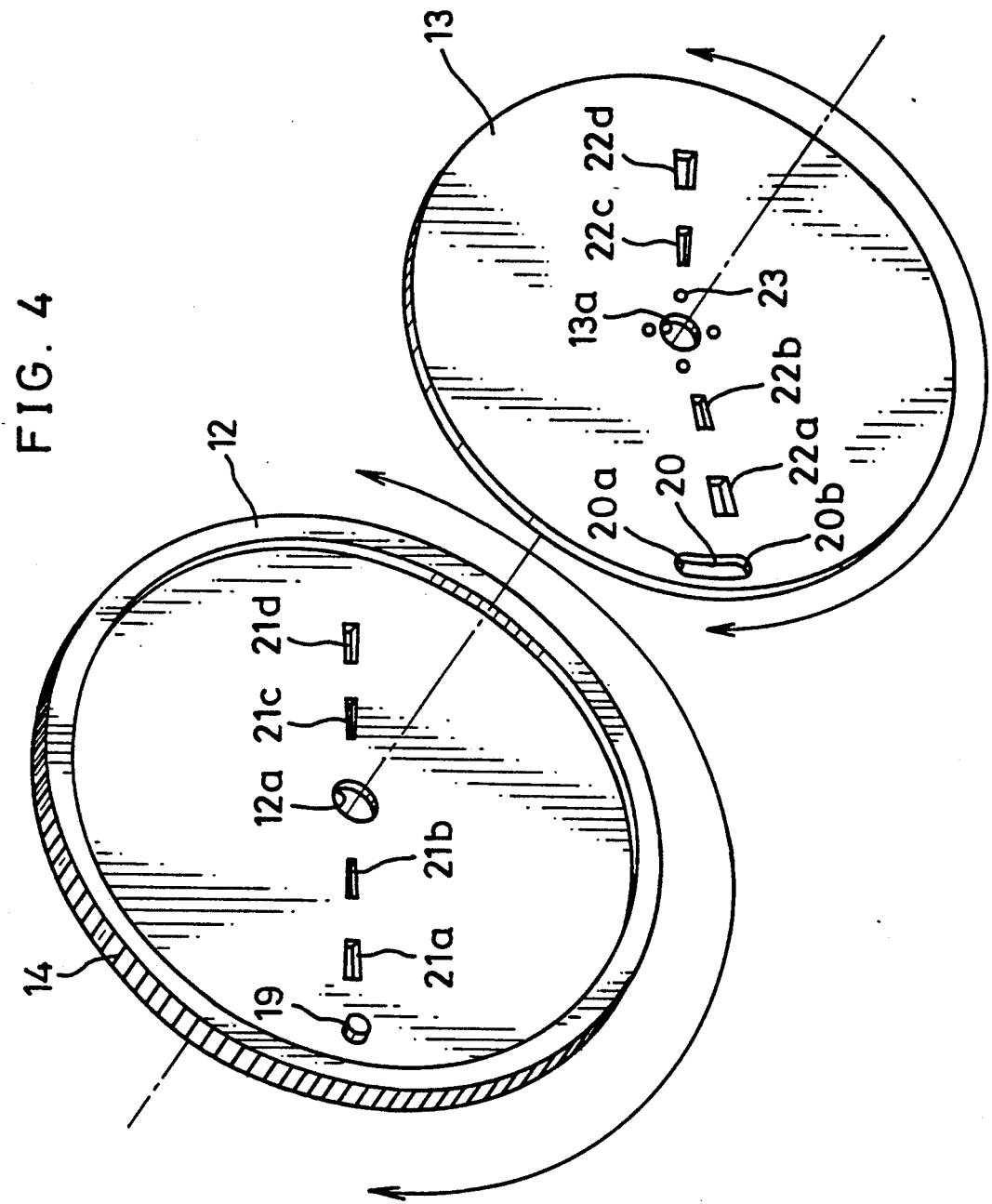
FIG. 4 is an exploded perspective view illustrating a pair of shutter disks.

In the disks 12 and 13 are formed openings 12a and 13a for receiving the shaft 11, as illustrated in FIG. 4. The disk 12 is provided with a pin 19 received shiftably in a slot 20 formed in the disk 13 in a direction along an arc concentric with the disk 13. When the disk 12 rotates clockwise, the pin 19 bears against end 20a of the slot 20 to rotate the disk clockwise. When the disk 12 rotates counterclockwise, the pin 19 bears against opposite end 20b of slot 20 to transmit rotation to disk 13 counterclockwise.

In the disk 12 are formed four holes 21a to 21d along a diameter lying on the pin 19. In the disk 13 are formed four holes 22a to 22d. Two holes 22a and 22b of the four holes 22a to 22d are formed along a radius between the slot end 20b and the disk center. The remaining two holes 22c and 22d are formed along an extension of the radius between the slot end 20a and the disk center. The disk 13 is provided with projections 23 around the opening 13a. The projections 23 bear against the stationary plate 10 with friction sufficient to keep the disk 13 from being rotated by inertia, e.g. upon an abrupt stopping of the disk 12.

Figure 5:
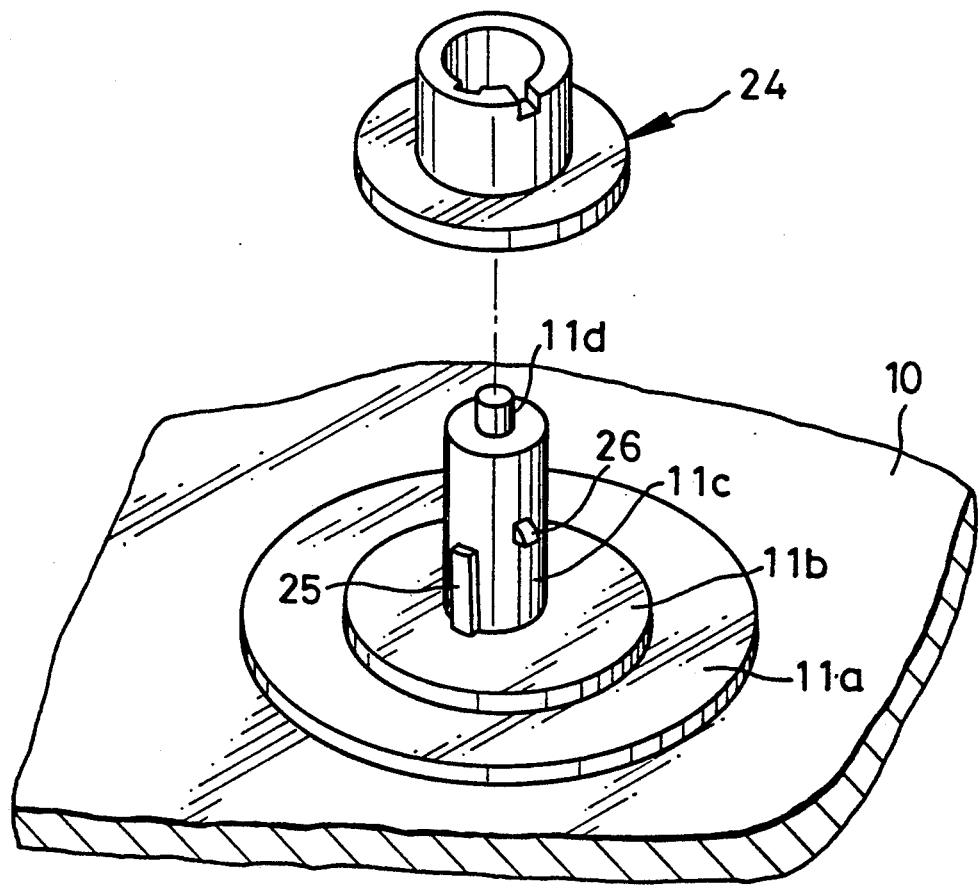
FIG. 5 is an exploded perspective view illustrating a shaft and a bush for bearing the disks illustrated in FIG. 4.

FIG. 5 illustrates the shaft 11 enlarged. The shaft 11 is constituted by a shaft base 11a, two stems 11b and 11c, and a shaft top lid. The disk 13 is mounted on the upper side of the base 11a, and is rotatably supported by the stem 11b. To prevent the disk 13 from being removed from the shaft 11, a bush 24 is fitted on the stem 11c. The outside of the bush 24 is adapted to provide an additional cylindrical surface that supports the rotation of the disk 12, for which the stem 11c is provided with a key 25 for locking the bush 24 in rotation therewith, and a hook 26 for keeping the bush 24 immovable axially. After the disk 12 is fitted around the bush 24, the shaft top lid is received in and fixed to the camera body 2 as illustrated in FIG. 3, so as to keep the disks 12 and 13 rotatable but to prevent their removal.

Partitions 27 are formed on the camera body 2, and define eight exposure chambers 32a to 32h having substantially the same size, in front of a photographic film 31. The exposure chambers 32a to 32d are not shown in FIG. 3, but are located respectively below the chambers 32e to 32h. The 32a to 32h split a 35 mm full size original frame 33 into eight sub-frames 34a to 34h, which are illustrated in FIG. 2, disposed in two horizontal rows and four vertical columns.

In view of the film mask which will be used in a photographic printer for making photoprints, optical vignetting will take place at the end portions of the lateral sub-frames 34a, 34d, 34e and 34h. If the full size original frame 33 were simply split vertically into four to form sub-frames, such as optical vignetting would cause a difference in the positions of the subject on the lateral sub-frames from those on the middle sub-frames 34b, 34c, 34f and 34g. However, in this embodiment, the widths of the lateral sub-frames are made greater than the widths of the middle sub-frames. In addition, the positions of the stationary openings 9a, 9d, 9e and 9h are preferably shifted inwardly from the centers of the lateral sub-frames. Thus, the optical axes of the taking lenses 3a to 3h are shifted inwardly toward the vertical center line of the full size original frame 33. A continuously taken photoprint can be thereby obtained with neatly aligned subjects in the sub-frames 34a to 34h.

When a take-up spool 35 is rotated counterclockwise as viewed in FIG. 2, the film 31 is transported from a cassette 36. A film winding motor 37 is mounted with the spool 35, and the driving force of the motor 37 is transmitted via a gear 38 to a film transporting mechanism 39. Receiving the drive force from the gear 38, the film transporting mechanism 39 drives the spool 35 via a gear 40 when winding the film, and drives a fork 42 via a gear 41 when rewinding the film 31 into the cassette 36.

A sprocket wheel 45 engages with perforations 31a and is rotated by movement of the film 31. The amount of transportation of the film 31 is detected by the sprocket wheel 45 and a rotary encoder 48. The rotary encoder 48 coupled to the sprocket wheel 45 is comprised by a signal plate 47 integral with the sprocket wheel 45 and provided with slits formed radially, and a photo sensor 48 for photoelectrically detecting the rotation of the signal plate 47. The photo sensor 48 detects the slits that pass during movement of the film 31, and generates a signal to stop the motor 37 upon thus having detected movement of the film 31 by the length of the full size original frame 33.

Figure 6:
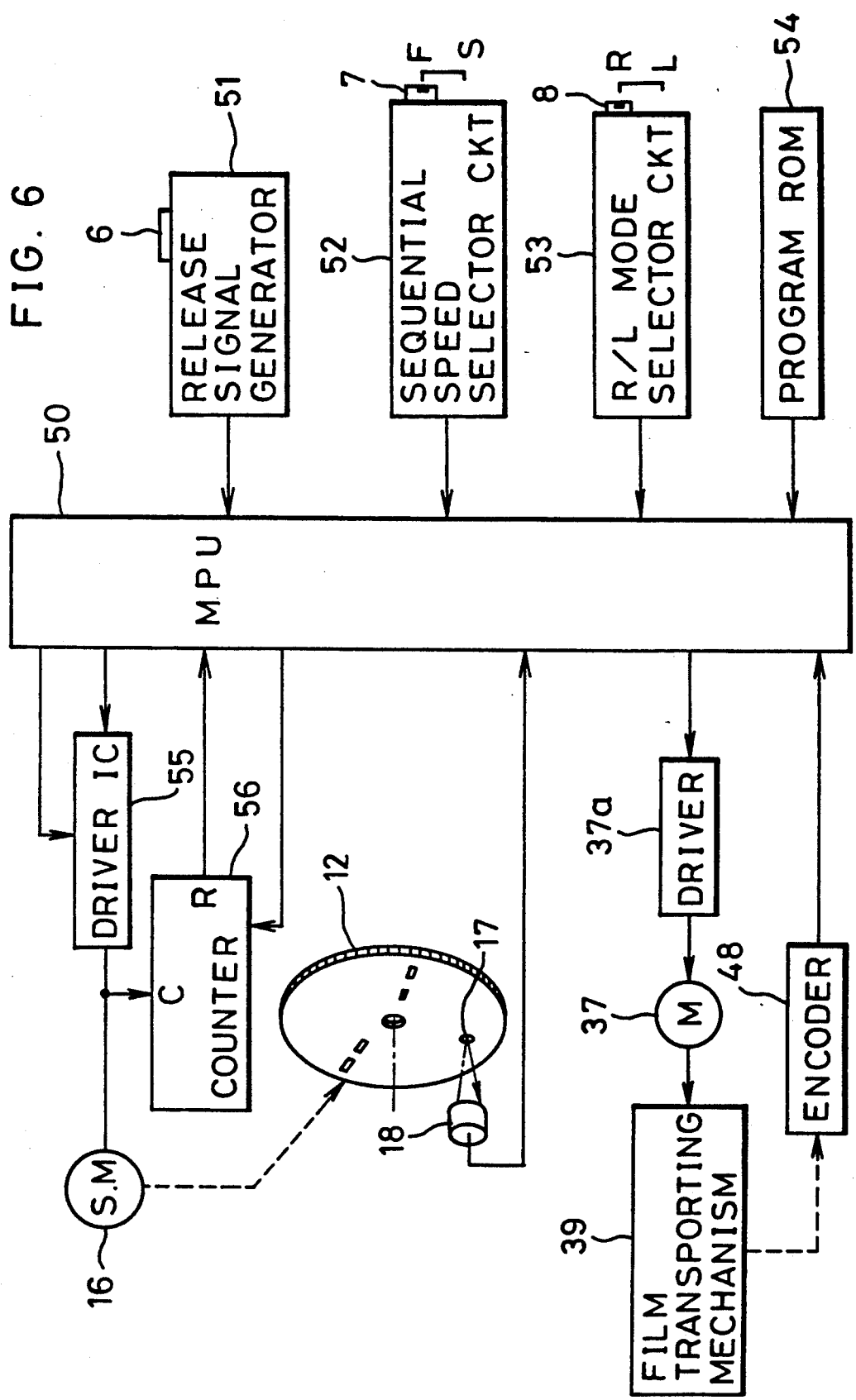
FIG. 6 is a schematic drawing of the circuit of the novel camera.

FIG. 6 is a block diagram showing the circuit arrangement of the continuous taking camera described above. The continuous taking sequence is managed by an MPU 50 which starts the sequence upon reception of a release signal from a release signal generator 51 when the release button 6 is depressed. A sequential speed selector circuit 52 sets eight frames per second (FAST mode) or four frames per second (SLOW mode) for continuous taking, in accordance with the set position of a sequential speed selector button 7. It is to be noted that the number of settings or the continuous taking speed may be adjusted.

An R/L mode selector circuit 53 selects a rotational direction, either forward or backward, of the shutter disks 12 and 13 for the continuous taking, in accordance with the set position of the R/L selector button 8. When a scene is continuously taken in which a subject moves toward the right as viewed by the photographer, e.g. a right-handed person playing golf, then the R/L selector button 8 is set to index R. Then, the R/L mode selector circuit 53 supplies to MPU 50 a rightward moving mode signal. When a scene is continuously taken in which a subject moves leftward, like a left-handed golf player, then the R/L selector button 8 is set to index L so that a leftward moving mode signal is supplied to MPU 50. A program ROM 54 stores a continuous taking sequence program according to which a continuous taking sequence is executed in accordance with signals from the sequential speed selector circuit 52 and R/L mode selector circuit 53.

Upon reception of a control signal and a pulsed clock signal from MPU 50, a driver IC 55 supplies drive pulses to the stepping motor 16. As is well known, the stepping motor 16 rotates in accordance with the number of drive pulses supplied, so that the rotational angle can be determined from the number of drive pulses and the rotation speed can be controlled by the frequency or interval of drive pulses.

The number of drive pulses supplied from the driver IC 55 to the stepping motor 16 is counted by a counter 56. MPU 50 monitors the count of the counter 56, and sends a control signal to the driver IC 55 each time the count reaches a predetermined value. In accordance with the control signal, the driver IC 55 changes the frequency and polarity of drive pulses supplied to the stepping motor 16, thereby to control the speed and rotational direction of the stepping motor 16. When the shutter disk 12 returns to a home position after one continuous taking sequence is completed, the counter 56 is supplied with a reset signal so that the count is cleared to zero. When the photo sensor 18 detects the reflector 17 fixed on the shutter disk 12, it sends a detection signal to MPU 50. MPU 50 monitors the detection signal from the photo sensor 18 to return the shutter disk 12 precisely to the home position, as will be described later.

MPU 50 counts the detection signals from the rotary encoder 48 to detect the film feeding amount. When a predetermined number of detection signals from the rotary encoder 48 is counted while winding the film, the rotation of the motor 16 is stopped. Reference numeral 37a represents a driver.

Figure 7:
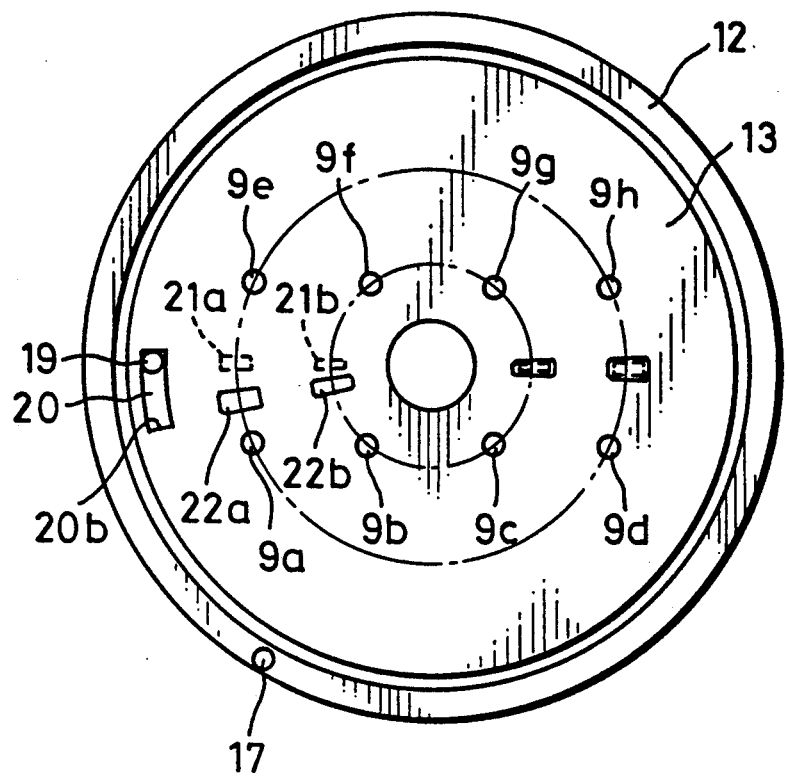
FIG. 7 is a front elevation of the disks in a home position.
Figure 8:
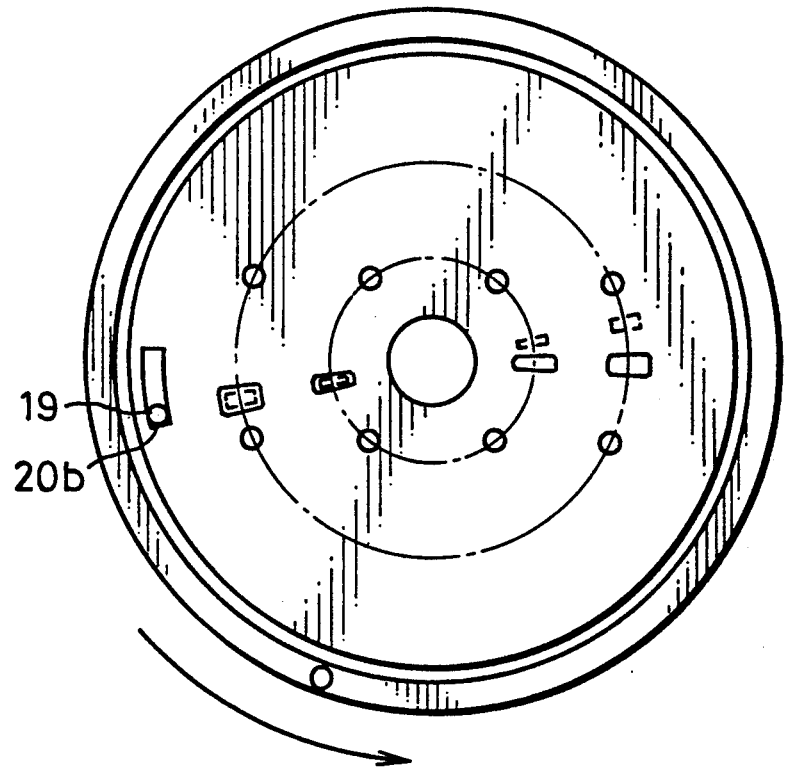
FIG. 8 is a view in front elevation in which the disks start rotation together.
Figure 9:
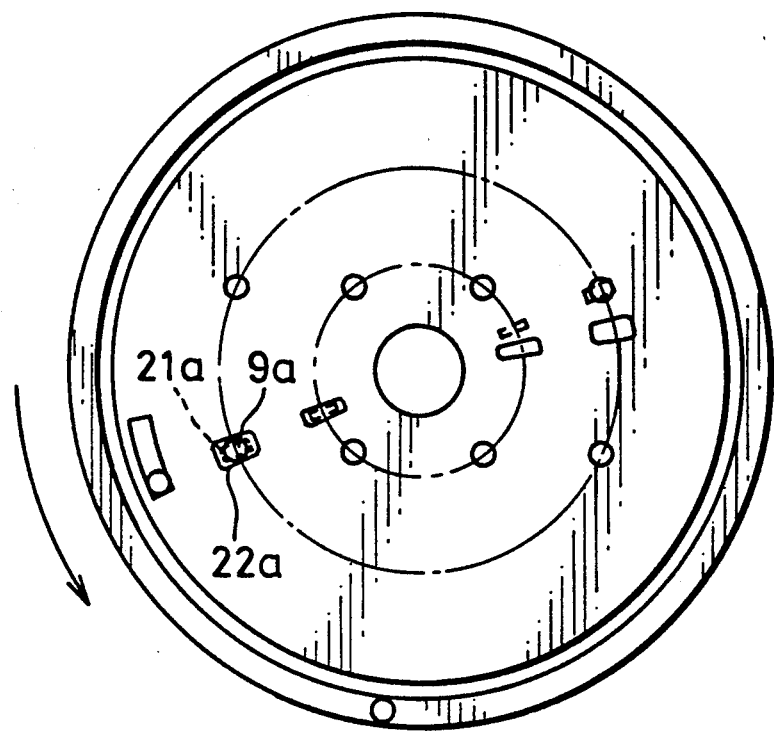
FIGS. 9–11 are views of the disks in position for effecting the first, second and fourth exposures, respectively.

The operation of the consecutive taking camera constructed as above will now be described as illustrated in FIGS. 7 to 15. For consecutively taking scenes of golf swings of a right-handed person from a top position scene to a follow-through position scene, the R/L mode selector button 8 is set to the index R. When the golf shaft is in the top position, the release button 6 is depressed. The stepping motor 16 rotates forward, and causes the gear 15 to rotate the disk 12 counterclockwise from the home position as illustrated in FIG. 7, as viewed from the front. The disk 12 having rotated to the position of FIG. 8, the pin 19 reaches and presses against the slot end 20b so that the disk 13 rotates with the disk 12. So long as the pin 19 is in contact with the slot end 20b, the holes 21a and 21b are superposed respectively on the holes 22a and 22b. The hole 22a with the hole 21a pass the position of the stationary opening 9a to open/close the opening 9a to make the first exposure, as illustrated in FIG. 9.

Figure 10:
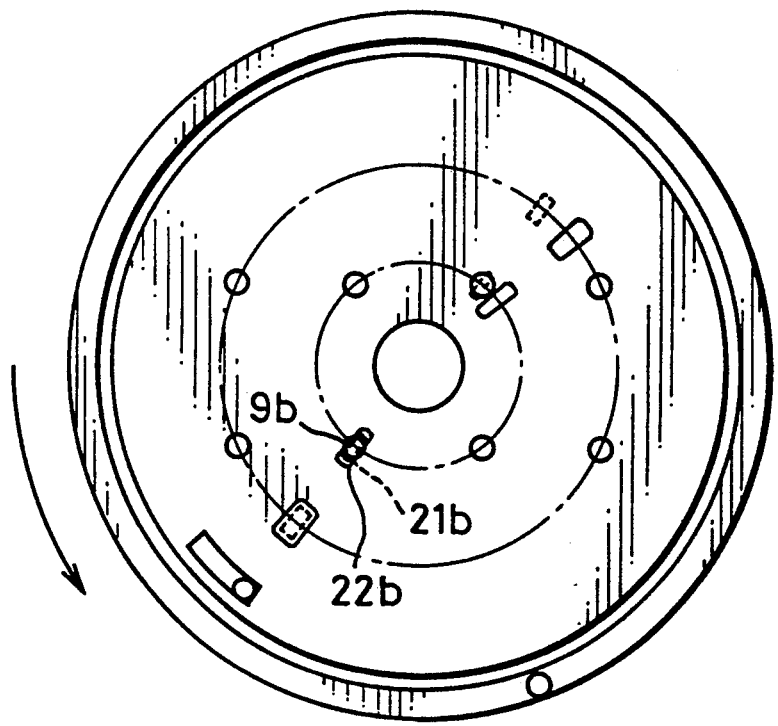
Figure 11:
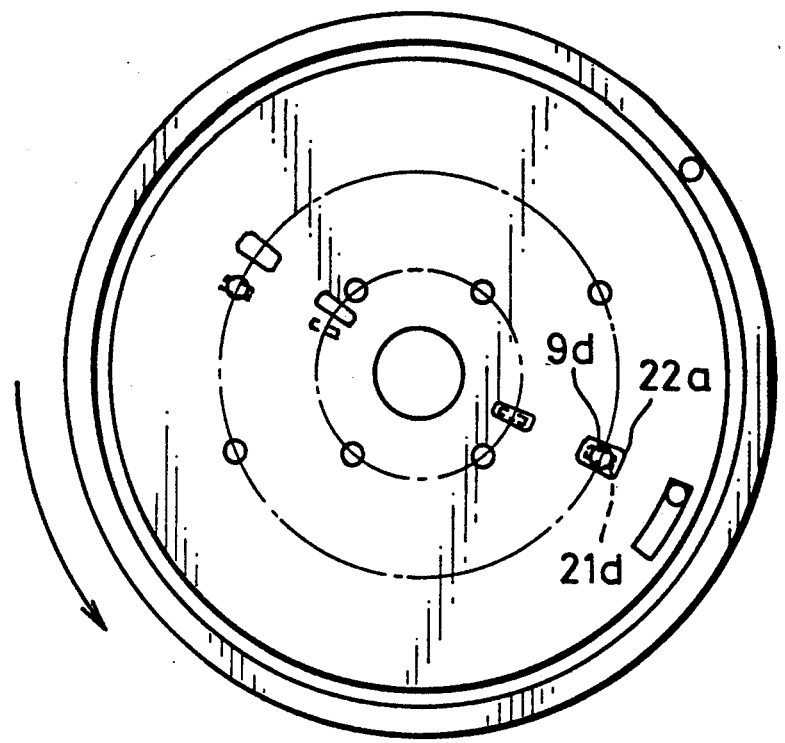
Figure 12:
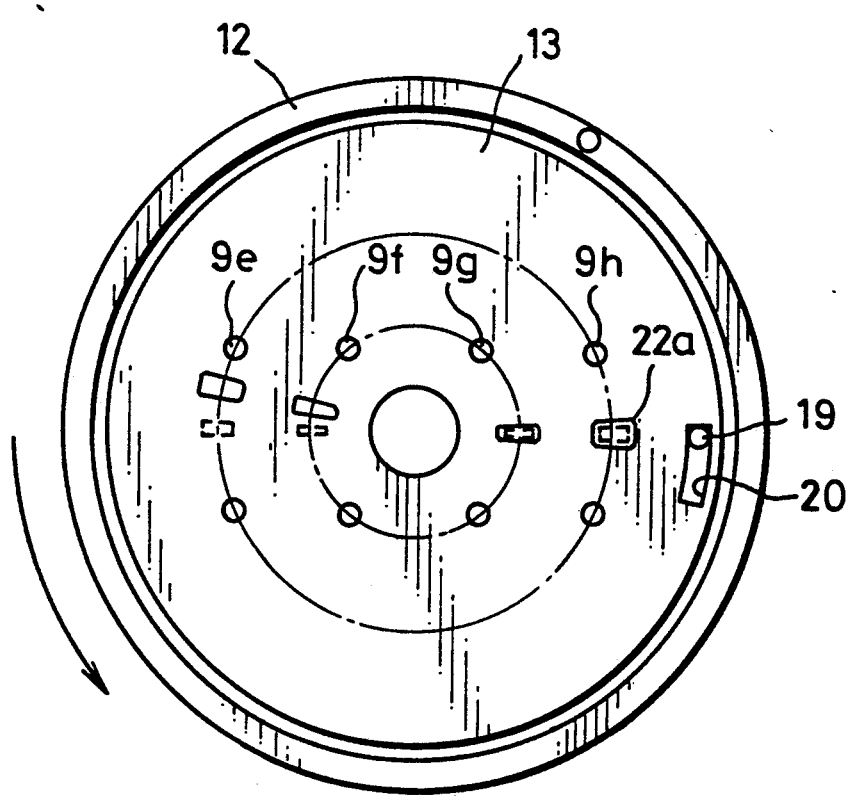
FIG. 12 is a view of the disk ready to be reversed in rotational direction.
Figure 13:
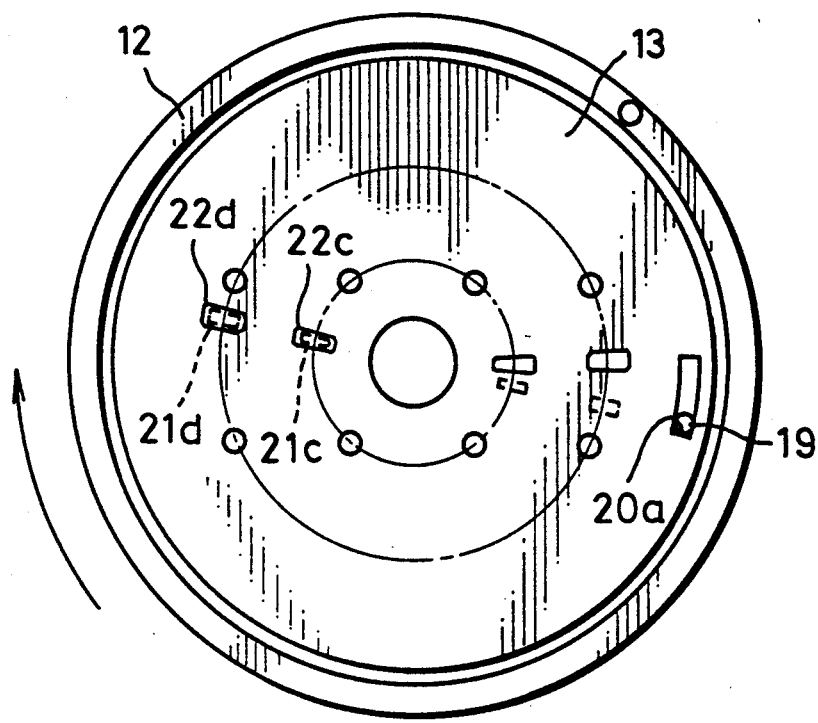
FIG. 13 is a view in which the disks start reverse rotation together.

The disk 12 continues to rotate. The hole 22b in line with the hole 21b next pass the position of the opening 9b to open/close the opening 9b to make the second exposure, as illustrated in FIG. 10. The hole 22b with the hole 21b then pass the opening 9c to open/close the same to make the third exposure. The hole 22a with the hole 21a in turn pass the opening 9d to open/close the same to make the fourth exposure, as illustrated in FIG. 11. The exposures through the lower four lenses 3a to 3d are thus completed. The disk 12 continues to rotate until the position for termination of the first row as illustrated in FIG. 12, at which the stepping motor 16 is stopped to stop the disk 12. The openings 9e to 9h have not been opened during the preceding half rotation of the disks 12 and 13.

Figure 14:
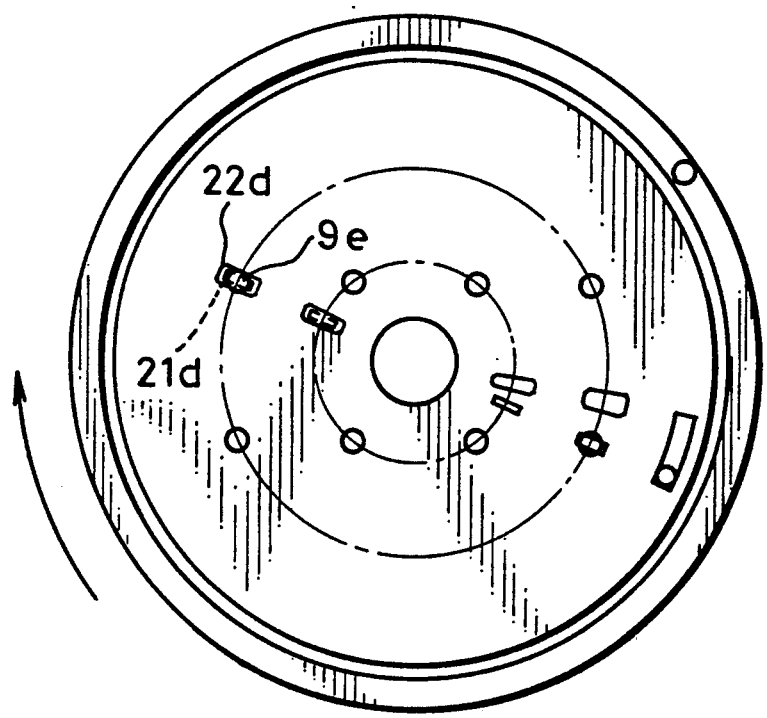
FIGS. 14 and 15 are views of the disks in position for effecting the fifth and eighth exposures, respectively.
Figure 15:
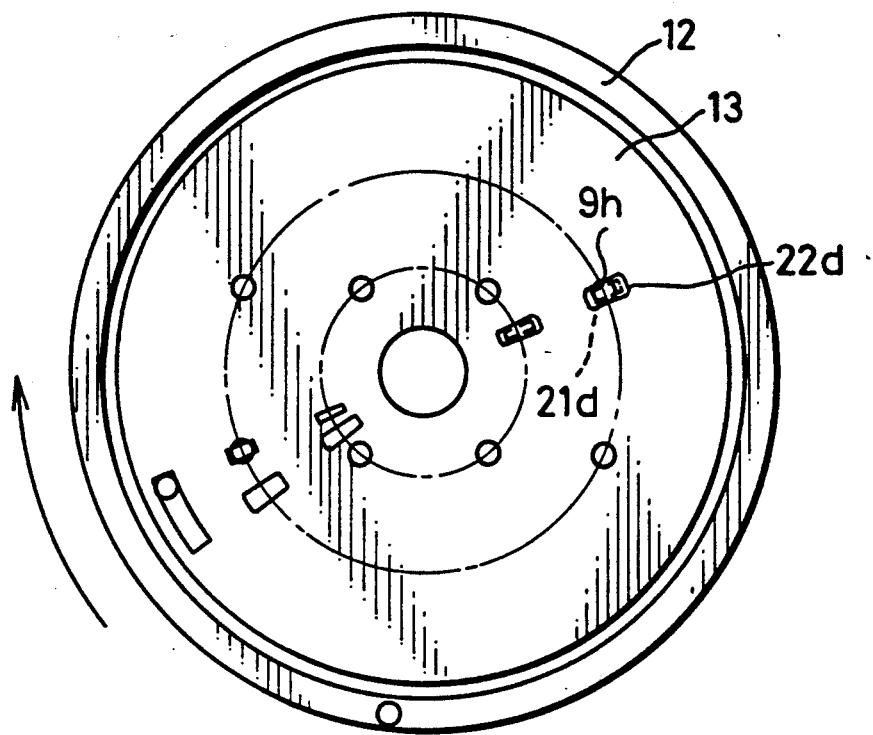

The stepping motor 16 is then reversely rotated to rotate the disk 12 clockwise. As the pin 19 shifts along the inside of the slot 20, the disk 12 rotates without driving the disk 13. When the disk 12 reaches the position illustrated in FIG. 13, the pin 19 reaches and presses against the slot end 20a so that the disk 13 rotates with the disk 12, this time clockwise. So long as the pin 19 is in contact with the slot end 20a, the holes 21c and 21d are superposed respectively upon the holes 22c and 22d. The hole 22d with the hole 21d pass the position of the opening 9e to open/close the same to make the fifth exposure, as illustrated in FIG. 14.

The hole 22c with the hole 21c in turn pass the openings 9f and then 9g to open/close those in order to make the sixth and seventh exposures. Finally, the hole 22d with the hole 21d pass the opening 9h to open/close the same to make the eighth and last exposure. The exposures through the upper four lenses 3a to 3d are thus completed. The disk 12 still rotates until it reaches the position for termination of the second row, i.e. the home position of FIG. 7, at which the stepping motor 16 is stopped to stop the disk 12. One sequence of taking continuous scenes is thus completed.

Figure 16:
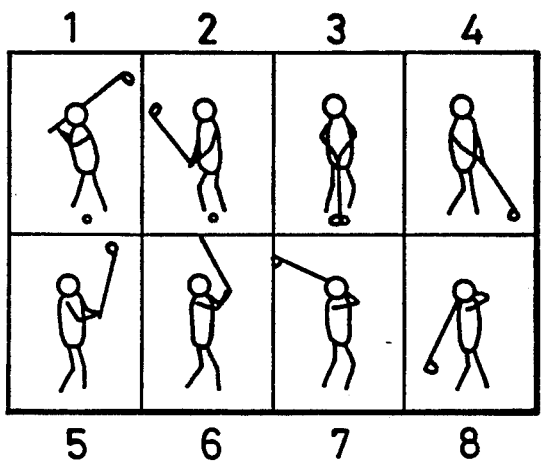
FIG. 16 is a view illustrating a photoprint made from the sub-frames on the film exposed in the novel camera.

The eight sub-frames 34a to 34h having been exposed in the order designated, an exposure completion signal is supplied to the driver 37a. The film transporting mechanism 39 is driven via the motor 37 to transport the film 31. When the film 31 is transported by an amount of the original frame of the 35 mm full size, the signal plate 47 and the photo sensor 48 detect the transported amount to stop the motor 37 and to place it on standby for the following exposures. When the sub-frames 34a to 34h as recorded on the film 31 are developed and subjected to printing, a photoprint as illustrated in FIG. 16 is obtained, in which the consecutive scenes are arranged in the direction of movement of the subject so as to be seen looking in the same direction as when the photographer views the subject.

Figure 17:
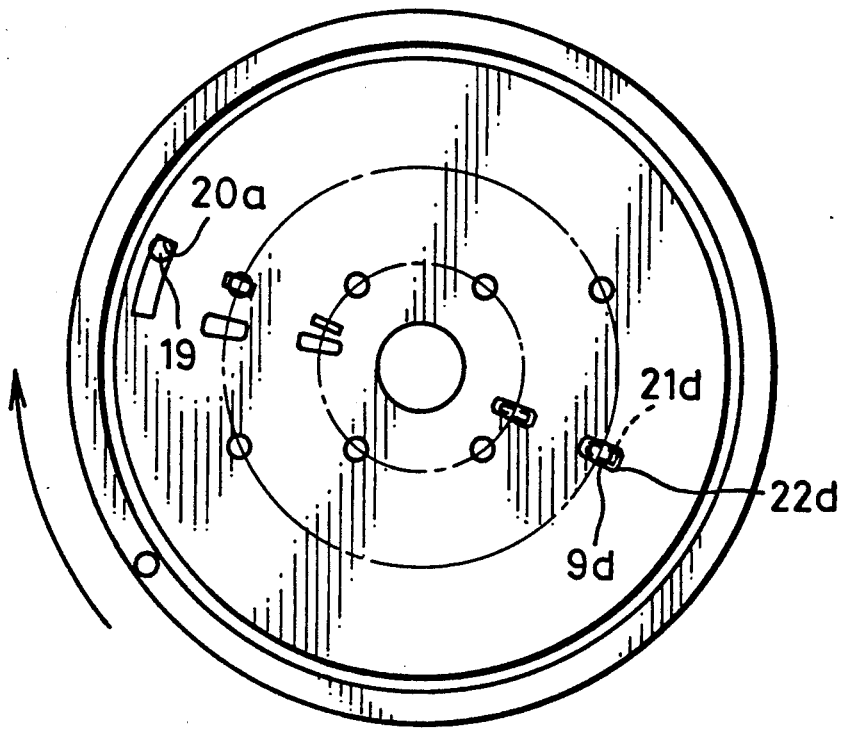
FIG. 17 is a view of the disks in the L mode ready to effect a first exposure.
Figure 20:
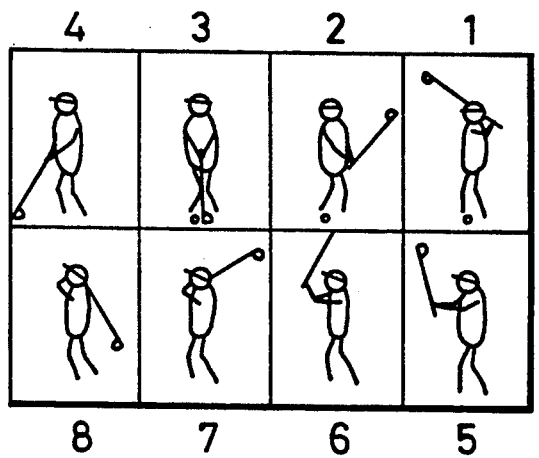
FIG. 20 is a view illustrating a photoprint made from sub-frames exposed in the L mode on the film.
Figure 18:
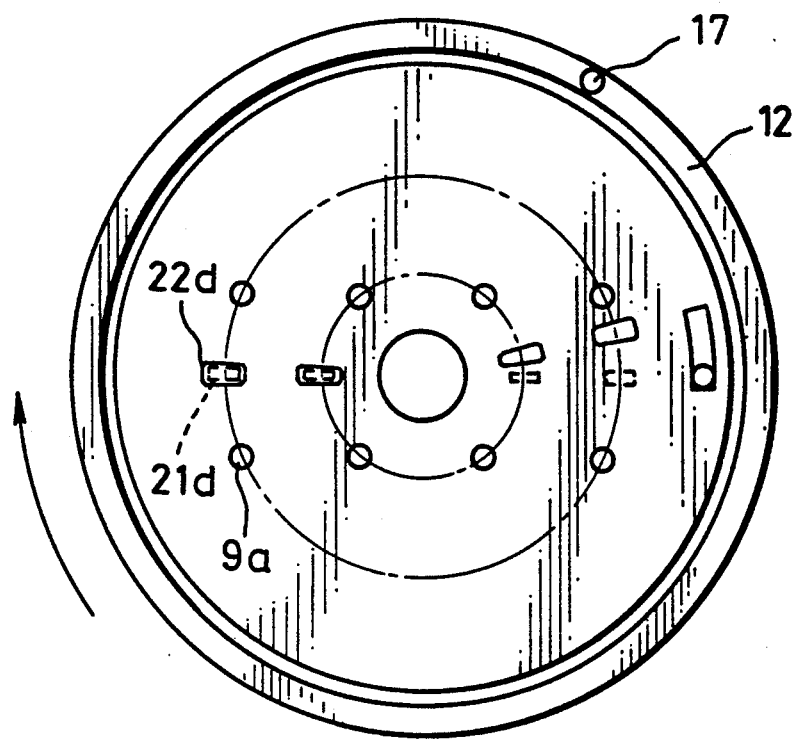
FIG. 18 is a view of the disks ready to be reversed in rotational direction.
Figure 19:
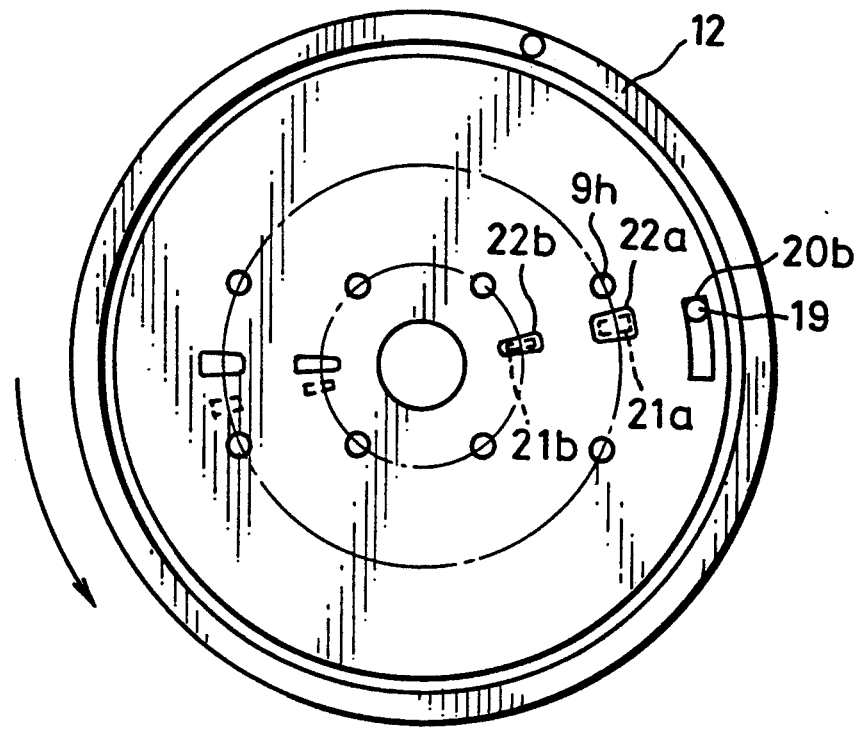
FIG. 19 is a view in which the disks start a reverse rotation together.

When the subject moves to the left as viewed by the photographer, e.g. a left-handed golf player, then the R/L mode selector button 8 is set at "L". The operation in the "L mode" will now be described. When the release button 6 is depressed, the stepping motor 16 is rotated backward to rotate the disk 12 clockwise from the home position as illustrated in FIG. 7. Because the pin 19 presses against the slot end 20a, the disk 13 follows the rotation of the disk 12 As illustrated in FIG. 17, the hole 22d with the hole 21d opens/closes the stationary opening 9d. The disks 12 and 13 then open/close the openings 9c, 9b and 9a in that order, to achieve exposures of the first row. When the disk 12 rotates to the position of FIG. 18, the stepping motor 16 is momentarily stopped and then is reversed and rotated forward, so as to rotate the disk 12 counterclockwise. The pin 19 is shifted and presses against the slot end 20b, so that the holes 21a and 21b are superposed respectively with the holes 22a and 22b as illustrated in FIG. 19. Further counterclockwise rotation of the disk 12 opens/closes the openings 9h, 9g, 9f and 9e in that order, to complete the exposures of the second row. The sub-frames 34a to 34h are therefore exposed in the order of 34d, 34c, 34b, 34a, 34h, 34g, 34f and 34e. A photoprint obtained from those sub-frames 34a to 34h is illustrated in FIG. 20.

Figure 21:
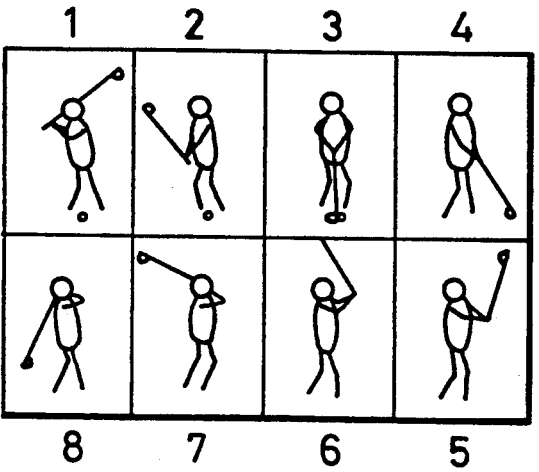
FIG. 21 is a view illustrating a photoprint made from sub-frames on the film exposed according to another preferred embodiment.

In the R mode according to the present embodiment, the disk 12 makes initially a half rotation counterclockwise and next a half rotation clockwise up to the home position. However, the disk 12 may make one counterclockwise rotation until it returns to the home position. A photoprint made from sub-frames recorded from the scenes the same as those of FIG. 16 is illustrated in FIG. 21, in which the consecutive scenes are arranged in the counterclockwise direction to follow the temporal order.

Figure 22:
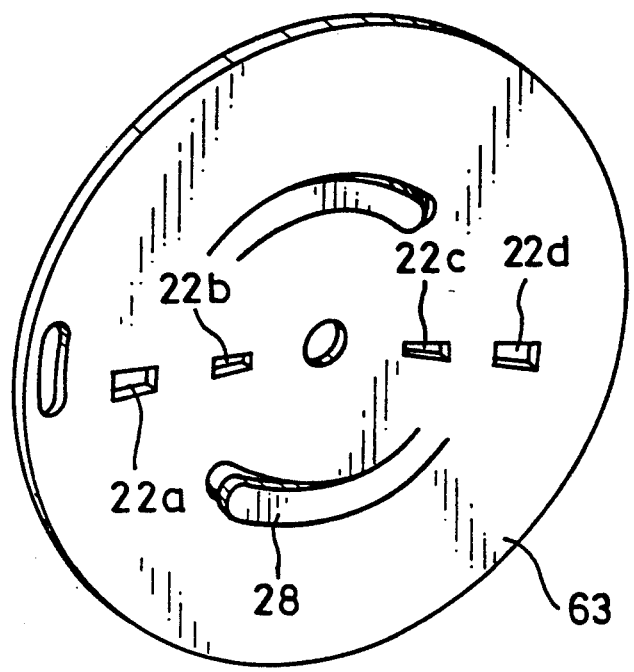
FIG. 22 is a perspective view illustrating another preferred embodiment of a follower disk.
Figure 23:
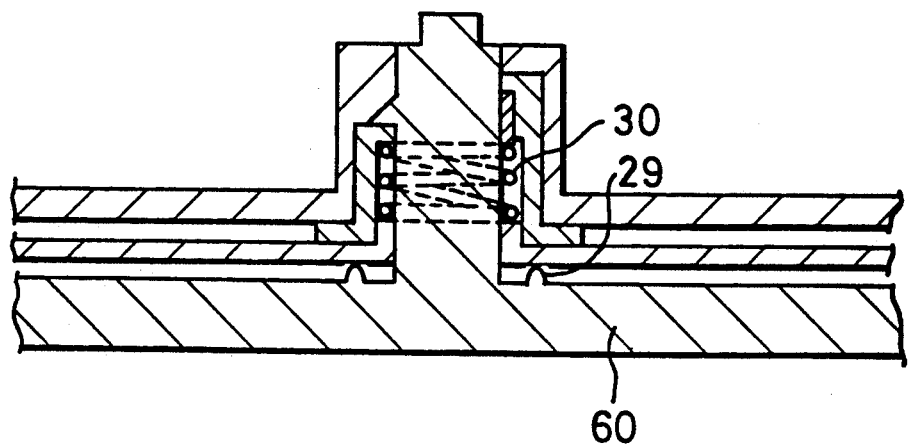
FIG. 23 is a cross section, partly broken away, illustrating still another preferred embodiment of shutter disks with a stationary plate.

The follower disk 13 in the present embodiment is provided with the projections 23 to keep the disk 13 from rotating by inertia. However, the projections 23 may be replaced by contact portions 28 of follower disk 63 bent toward the disk 12 as illustrated in FIG. 22, or by projections 29 on a stationary plate 60 as illustrated in FIG. 23, for which the disk 13 is pressed against the projections 29 by the bias of a spring 30.

In order to avoid formation of black stripes at the border between adjacent sub-frames, the partitions 27 defining the exposure chambers 32a to 32h are spaced apart from the photographic film 31 at a distance. Furthermore, in order to allow light to fall on the border portion of each sub-frame, the rear edge of each partition 27 is tapered. The borders between the horizontally adjacent sub-frames 34a to 34h are double-exposed and adapted to appear bright on a photoprint, thereby to obtain an attractive consecutively taken photograph without black stripes.

In the above embodiments, two lens plates each mounting four lenses are used. Instead of this, four lens plates each mounting two lenses, or a single lens plate mounting eight lenses may also be used. Furthermore, the number of original sub-frames to be taken on each of the two rows may, instead of four, be three, five and so on. It is to be noted that, when one row includes three sub-frames, each disk requires four holes, and when one row includes five sub-frames, each disk requires six holes.

Film advance may be manually performed by operating a film wind-up wheel.

Each sub-frame on a photoprint is horizontally arranged by following the temporal order of the consecutive scenes. Performance in reproducing the consecutive scenes is favorably high, and photoprints can be obtained at a low cost and of a size convenient for customers to observe.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A continuous taking camera comprising:
   2N exposure chambers arranged in a matrix for allowing light to fall on photographic film, so as to split at least one full size original frame into sub-frames arranged in two rows across the width of said film and in N columns along the length of said film, wherein N is an integer equal to at least 3;
   2N taking lenses disposed respectively in front of said exposure chambers;
   a stationary plate disposed between said taking lenses and said exposure chambers;
   2N stationary openings formed in said stationary plate in registry with said exposure chambers;
   first and second shutter disks rotatably supported on said stationary plate;
   a first hole group formed in said first disk and constituted of M holes, wherein M is an integer equal to at least 2;
   a second hole group formed in said second disk and constituted of M holes; and
   means for displacing said first and second disks relative to each other in order to change said first and second hole groups between an open condition wherein holes of respective hole groups register with each other and a closed condition wherein holes of respective hole groups are displaced from each other, said hole groups being adapted to open/close said 2N stationary openings sequentially, said two disks being so actuable as to take sequential scenes on said 2N sub-frames.

2. A continuous taking camera as defined in claim 1, wherein said disks are coaxial about a common axis and said displacing means displace said disks by relative rotation about said common axis.

3. A continuous taking camera as defined in claim 1, wherein said two disks are supported on a single shaft to be coaxial, and said shaft passes through a center of disposition of said 2N stationary openings.

4. A continuous taking camera as defined in claim 3, wherein N is equal to either 2M or 2M−1.

5. A continuous taking camera as defined in claim 4, further comprising:
   a third movable hole group symmetrical with said first hole group with respect to said shaft and constituted by M holes;
   a fourth movable hole group symmetrical with said second hole group with respect to one line and constituted by M holes; and
   means for changing the direction of rotation of said disks between forward and backward directions;
   wherein said displacing means brings said first and second hole groups into said open condition and said third and fourth hole groups into said closed condition when said two disks rotate in said forward direction, and brings said first and second hole groups into said closed condition and said third and fourth hole groups into said open condition when said two disks rotate in said backward direction.

6. A continuous taking camera as defined in claim 5, wherein said rotation changing means includes:
   a motor for rotating said two disks; and
   a switch for predetermining the rotational direction of said motor in accordance with a direction of movement of a subject to be photographed toward the right or the left.

7. A continuous taking camera as defined in claim 6, wherein said disks are caused to make one rotation in one direction from a reference rotational position, and a photographic sequence is completed when said disks return to said reference position.

8. A continuous taking camera as defined in claim 6, further comprising:
   means for causing said disks to make half a rotation in one direction from a reference rotational position, and for rotating said disks in a direction reverse thereto, said disks making half a rotation to said reference position to complete a photographic sequence;
   wherein said disks open/close N of said stationary openings in a first row sequentially in a first direction, and then open/close N of said stationary openings in a second row sequentially in said first direction, when said switch is switched to predetermine a rightward direction; and
   said disks open/close said N stationary openings in said first row sequentially in a second direction opposite to said first direction, and then open/close said N stationary openings in said second row sequentially in said second direction, when said switch is switched to predetermine a leftward direction.

9. A continuous taking camera as defined in claim 1, wherein said displacing means includes:
   a pin provided on said first disk; and
   a slot formed in said second disk in the shape of an arc for receiving said pin shiftably, said first and second hole groups being brought into said open condition when said pin is located at a first end of said slot, and said third and fourth hole groups being brought into said open condition when said pin is located at a second end of said slot.

10. A continuous taking camera as defined in claim 1, wherein:
    said second disk is disposed between said first disk and said stationary plate; and
    contact keeping means is provided for keeping said second disk in frictional contact with said stationary plate in order to prevent said second disk from rotating relative to said first disk by inertia.

11. A continuous taking camera as defined in claim 10, wherein said contact keeping means includes a contact portion defined by a channel-shaped slot in said second disk and bent in inclination toward said stationary plate.

12. A continuous taking camera as defined in claim 10, wherein said contact keeping means includes:
    at least one projection protruding from said stationary plate to said second disk; and
    a spring for pressing said second disk against said stationary plate.

13. A continuous taking camera as defined in claim 10, wherein said contact keeping means includes at least one projection protruding from said second disk to said stationary plate.

14. A continuous taking camera as defined in claim 9, wherein said motor drives said first disk and said second disk rotates by following said first disk via said pin and said slot.

15. A continuous taking camera as defined in claim 5, wherein said second and fourth hole groups define between them an obtuse angle.

16. A continuous taking camera as defined in claim 7, further comprising:
    reference means associated with said first disk for signaling said reference rotational position; and
    sensor means for detecting said reference means.

17. A continuous taking camera as defined in claim 6, wherein said motor is a stepping motor.

18. A continuous taking camera as defined in claim 1, wherein said first and second disks are disposed behind said stationary plate.

19. A continuous taking camera as defined in claim 1, wherein a rear edge of a partition between each adjacent two of said exposure chambers is spaced from said film so as to expose a border area between each adjacent two of said sub-frames.

20. A continuous taking camera as defined in claim 1, wherein two lens plates are provided with respective N of said taking lenses mounted therein.

21. A continuous taking camera as defined in claim 1, wherein $N=4$, and $M=2$.

* * * * *